(12) United States Patent
Chefson

(10) Patent No.: US 11,131,748 B2
(45) Date of Patent: Sep. 28, 2021

(54) METHOD FOR DETECTING RADARS AND RELATED DEVICE

(71) Applicant: AVANTIX, Aix en Provence (FR)

(72) Inventor: Loic Chefson, Aix-en Provence (FR)

(73) Assignee: AVANTIX, Aix-en-Provence (FR)

( * ) Notice: Subject to any disclaimer, the term of this patent is extended or adjusted under 35 U.S.C. 154(b) by 280 days.

(21) Appl. No.: 16/229,667

(22) Filed: Dec. 21, 2018

(65) Prior Publication Data

US 2019/0195983 A1    Jun. 27, 2019

(30) Foreign Application Priority Data

Dec. 27, 2017 (FR) ........................................ 1701380

(51) Int. Cl.
*G01S 7/02* (2006.01)
(52) U.S. Cl.
CPC .................................... *G01S 7/021* (2013.01)
(58) Field of Classification Search
CPC ....................................................... G01S 7/021
USPC ................................ 342/195, 20, 16, 14, 13
See application file for complete search history.

(56) References Cited

U.S. PATENT DOCUMENTS

| | | | | |
|---|---|---|---|---|
| 4,918,455 A * | 4/1990 | Maier | ...................... | G01S 7/021 342/13 |
| 7,397,415 B1 | 7/2008 | Wang et al. | | |
| 7,830,297 B1 | 11/2010 | Wang et al. | | |
| 8,738,678 B2 * | 5/2014 | Williams | ................... | G06T 5/20 708/300 |
| 9,519,049 B1 * | 12/2016 | Kadambe | ................ | G01S 7/022 |
| 10,135,488 B2 * | 11/2018 | Stofer | ................... | H04B 1/7163 |
| 10,509,102 B2 * | 12/2019 | Grandin | .................. | G01S 7/021 |
| 2003/0085831 A1 | 5/2003 | Lavoie | | |
| 2011/0150053 A1 * | 6/2011 | Kim | ........................ | G01S 7/021 375/219 |
| 2016/0209492 A1 * | 7/2016 | Grandin | ............... | H04B 1/7163 |
| 2017/0366223 A1 * | 12/2017 | Stofer | ..................... | G01S 7/021 |
| 2018/0172794 A1 * | 6/2018 | Rossman | .................. | G01S 3/04 |

OTHER PUBLICATIONS

Jukka-Pekka Kauppi, Hierarchical classification of dynamically varying radar pulse repetition interval modulation patterns, Neural Networks 23 (2010) 1226-1237, Jun. 24, 2010 (Year: 2010).*
Search Report as issued in French Patent Application No. 1701380, dated Oct. 8, 2018.

* cited by examiner

*Primary Examiner* — Erin F Heard
*Assistant Examiner* — Michael W Justice
(74) *Attorney, Agent, or Firm* — ARC IP Law, PC; Joseph J. Mayo

(57) ABSTRACT

A method for detecting at least one radar transmitter in an environment, the method being implemented by a device including a calculating unit and an antenna array including at least one antenna able to make acquisitions of the environment as acquisition signals and to receive and transmit the acquisition signals in a digital form to the calculating unit, the calculating unit being able to make processing on digitised signals, the method including receiving and digitising the acquisition signals as digitised signals and transmitting the digitised signals to the calculating unit; cutting off the digitised signals into pulses, characterising each pulse to obtain primary characteristics and secondary characteristics; gathering the pulses into pulse blocks.

14 Claims, 6 Drawing Sheets

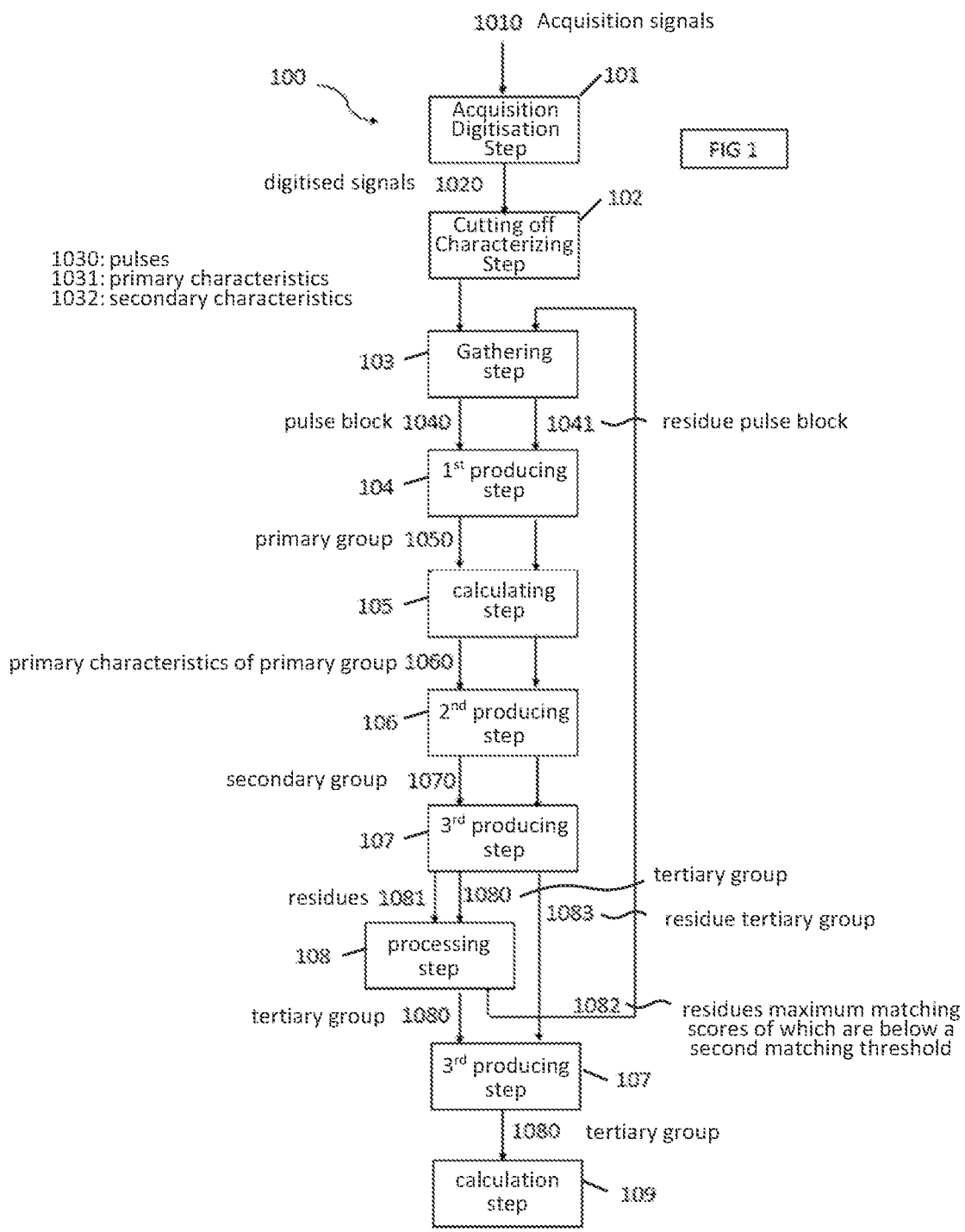

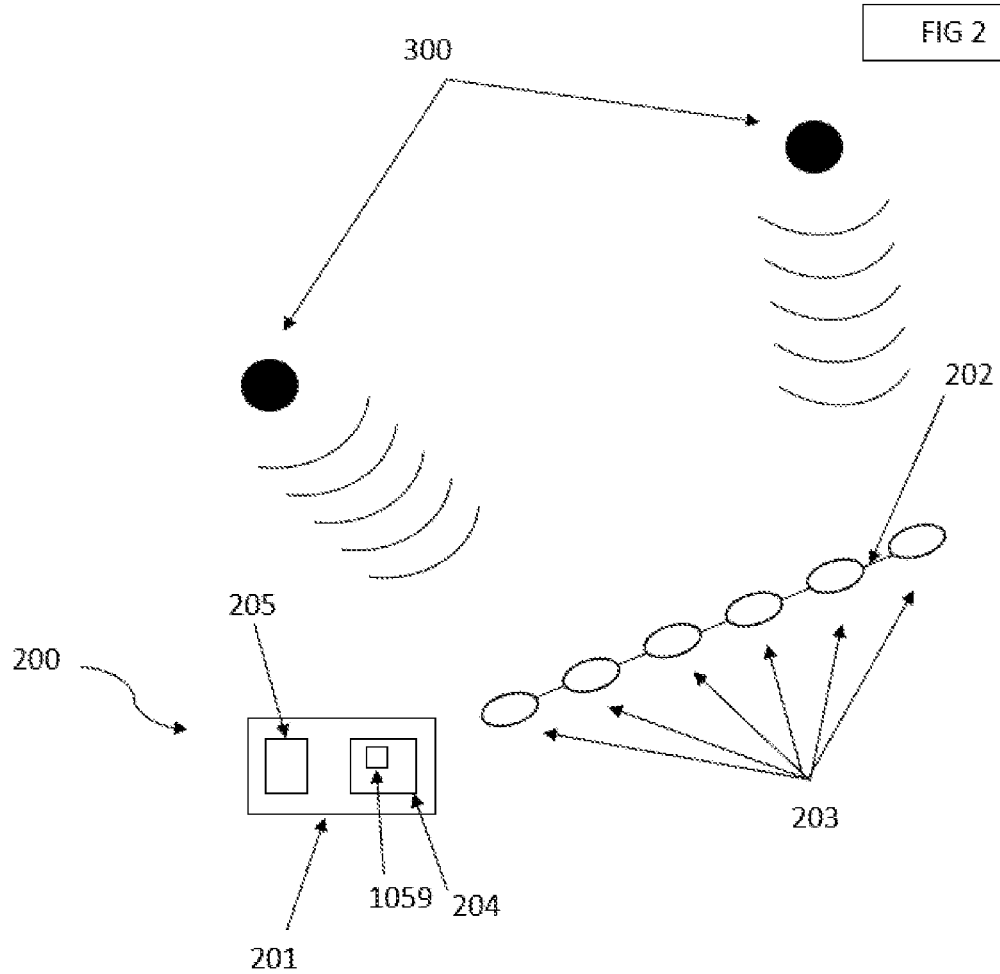

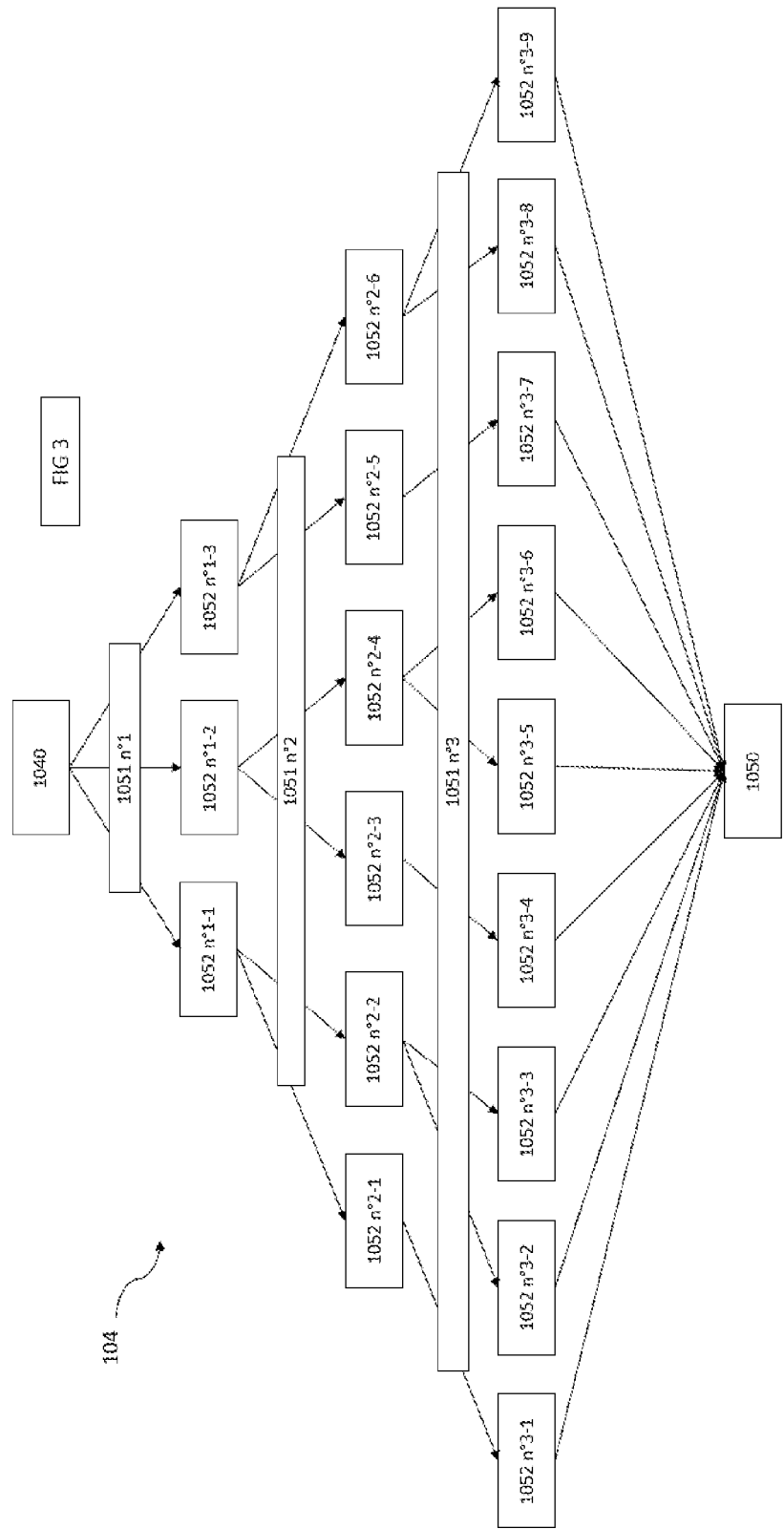

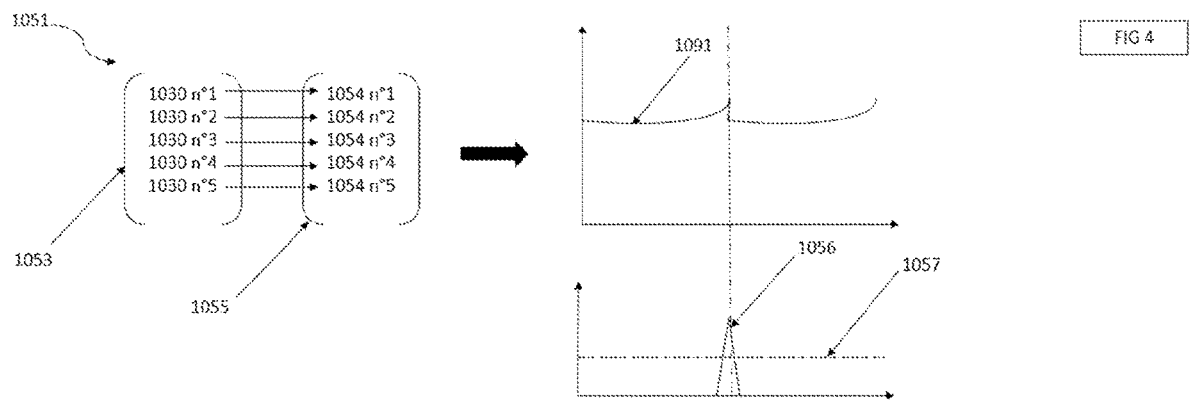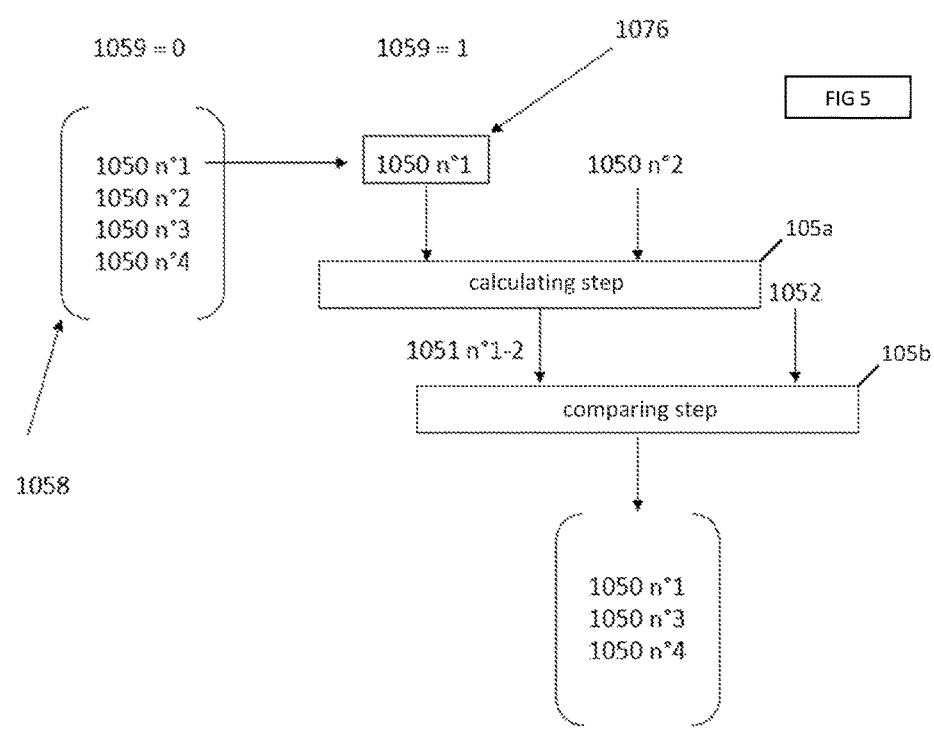

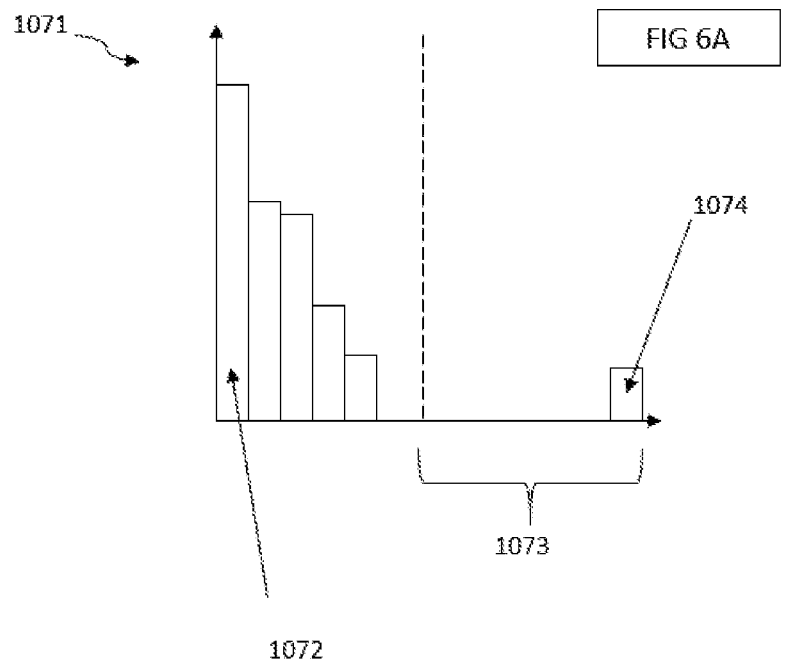
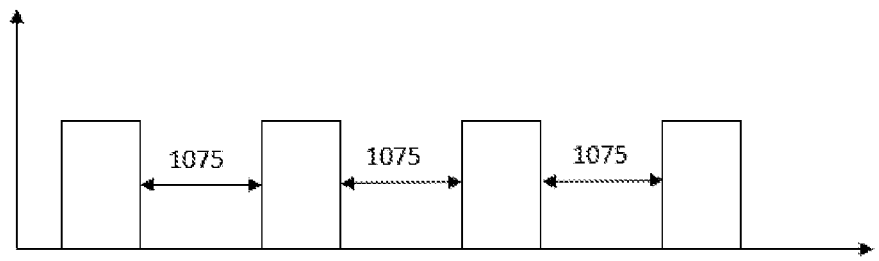

METHOD FOR DETECTING RADARS AND RELATED DEVICE

CROSS-REFERENCE TO RELATED APPLICATIONS

This application claims priority to French Patent Application No. 1701380, filed Dec. 27, 2017, the entire content of which is incorporated herein by reference in its entirety.

FIELD

The technical field of the invention is that of radar detection.

The present invention relates in particular to a method for detecting radars implemented by a device including an antenna array. The present invention also relates to a device, a computer program product and a recording medium for implementing such a method.

BACKGROUND

There are two main types of radar: continuous wave radars the signals of which are continuous and pulse radars the signals of which consist of discrete pulses. Among radars, transmitters can be with fixed or scanning antennas, that is the transmitter always transmits in the same direction or it transmits in several directions with a periodic alternation between active periods and quiet periods. Each radar is itself adjusted according to parameters specific thereto: signal frequency, signal power, pulse time instants etc. Therefore, there is a multitude of different behaviours according to the type of radars, according to the radar and its parameterising but also within a same radar which can have several modes, that is several sets of different parameters.

When a sensor records an acquisition signal of its environment to detect the presence of one or more radars, in most cases, several radars in the environment are active at the same time instants. The signals from the radars are thus interleaved within the acquisition signal and it is difficult to discriminate between the different radars. The task is all the more difficult that some radars can have similar parameterisations.

The purpose of de-interleaving algorithms is to separate and gather the pulses from each of the radars from the mixture provided by the sensor. Generally, these algorithms do not obtain satisfactory results in real situations: they do not succeed neither in detecting all the radars of the environment, nor in distinguishing several modes of a same radar they assign to different radars. These algorithms thus fail to draw up a reliable report of the active radars in the environment of the sensor.

Thus, there is a need for detecting and discriminating in a received signal between all the radars that have emitted electromagnetic waves over the acquisition duration of the sensor whatever the type of radars and whatever the set(s) of parameters according to which these radars operate.

SUMMARY

An aspect of the invention offers a solution to the previously discussed problems, by enabling a report of the active radars to be drawn up in the environment of a sensor during its acquisition duration, that is by identifying the exact number of radars, whatever the type and the set(s) of parameters of each radar.

A first aspect of the invention relates to a method for detecting at least one radar in an environment, the method being implemented by a device including a calculating unit and an antenna array including at least one antenna able to make acquisitions of the environment as acquisition signals and to receive and transmit the acquisition signals in a digital form to the calculating unit, the calculating unit being able to make processing on digitised signals, the method including the following different steps of:
receiving and digitising the acquisition signals as digitised signals and transmitting the digitised signals to the calculating unit;
cutting off the digitised signals into pulses, characterising each pulse to obtain primary characteristics and secondary characteristics;
gathering the pulses into pulse blocks;
for each pulse block:
gathering the pulses as a function of their primary characteristics to produce primary groups;
for each primary group:
calculating primary characteristics of primary groups as a function of the primary characteristics of the pulses gathered in the primary group;
gathering the primary groups as a function of the primary characteristics of primary groups to produce secondary groups;
gathering the secondary groups as a function of secondary characteristics of the pulses gathered in each secondary group to produce tertiary groups;
detecting at least one radar, each tertiary group being considered as a radar or a radar mode.

By virtue of the invention, several primary characteristics and several secondary characteristics of a pulse are taken into account upon gathering the pulses. The primary groups are formed by considering the primary characteristics of all the pulses taken alone, that is by considering the primary characteristics at the pulse scale and then are gathered in two merging steps, a first step using the primary characteristics of the primary groups that is by considering the primary characteristics at the scale of the primary group to form secondary groups and a second step using the secondary characteristics of the pulses contained in the secondary groups to form tertiary groups. Therefore, the tertiary groups are formed by taking different types of characteristics at different scales into account and the number of radars is thus determined more precisely than if the analysis only uses the primary characteristics or only the secondary characteristics of the pulses.

Besides the characteristics just discussed in the previous paragraph, the detection method according to a first aspect of the invention can have one or more complementary characteristics among the following ones, considered alone or according to any technically possible combinations.

Beneficially, the primary characteristics of a pulse can be chosen from at least the group formed by the following characteristics: pulse frequency, pulse duration, pulse level, pulse direction of arrival and pulse internal modulation.

Thus, the primary characteristics are data easy to be determined from the pulses.

Beneficially, the step of producing primary groups includes the following sub-steps of:
selecting at least one primary characteristic;
initialising the result of the production of the primary groups by a partition including the pulses of the pulse block;
for each selected primary characteristic, producing at least one partition by implementing a partitioning algorithm, the partitioning algorithm sequentially partitioning the partitions obtained after the implementation of this sub-step for the previous primary characteristic or the initialisation of the result;

the primary groups are the partitions obtained after all the selected primary characteristics have been processed.

Thus, the formation of the primary groups is pyramidal: each partitioning step uses the groups generated in the previous step to form new groups. Thus, the primary groups take all the primary characteristics into account independently of each other.

Beneficially, the partitioning algorithm uses a metrics based on the primary characteristic used and produces an ordered list of pulses, each pulse being associated with a distance value according to said metrics, the ordered sequence of distance values obtained being then considered as a function, the separation between two partitions being made at a pulse for which the value of the derivative of said function meets a predetermined condition relating to a predetermined derivative threshold.

Thus, it is easy to make the partitioning based on the results of a partitioning algorithm already existing in the OPTICS algorithm or DBSCAN algorithm.

Beneficially, the primary characteristics of primary groups of a primary group are calculated by averaging the values of the primary characteristics of the pulses gathered in the primary group.

Thus, the primary characteristics of primary groups are representative of all the values of the primary characteristics of the pulses making up the primary group.

Beneficially, the step of producing the secondary groups includes several sub-steps of:
 ordering the primary groups within a first ordered list, each primary group having a rank in the first ordered list, the ranks being chosen arbitrarily increasing and higher than or equal to 1;
 assigning a current rank to 0;
 as long as primary groups having a rank higher than the current rank remain in the first ordered list:
  selecting the primary group the rank of which is the closest to the current rank without being equal to the current rank such that it becomes the current primary group and assigning to the current rank the rank of the current primary group;
  calculating a first similarity measurement as a function of the primary characteristics of primary groups between the current primary group and each of the primary groups having a rank higher than the current rank remaining in the first ordered list;
  for each primary group having a rank higher than the current rank the first similarity measurement of which is higher than a first predetermined similarity threshold, merging the primary group with the current primary group and removing the primary group from the ordered list;
 the secondary groups are the primary groups remaining in the first ordered list.

Thus, a first merging step is made by a first similarity measurement based on the primary characteristics of the primary groups.

Beneficially, the secondary characteristics of a pulse include the pulse time instant.

Thus, it is possible to make a histogram of the pulse time instants differences which contain useful information to determine time values characterising a radar.

Beneficially, the step of producing the tertiary groups includes several sub-steps of:
 for each secondary group:
  making a histogram of the pulse time instant differences of the pulses of the secondary group, which histogram of the pulse time instant differences represents the occurrence of the pulse time instant differences on a plurality of time intervals called bins;
  studying the second half of the histogram of the pulse time instant differences: if all the occurrences are null except for the occurrence of the last bin, estimating a time value characterising the secondary group;
 ordering the secondary groups within a second ordered list, each secondary group having a rank in the second ordered list, the ranks being chosen arbitrarily increasing and higher than or equal to 1;
 assigning a current rank to 0;
 as long as secondary groups having a rank higher than the current rank remain in the second ordered list:
  selecting the secondary group the rank of which is the closest to the current rank without being equal to the current rank such that it becomes the current secondary group and assigning to the current rank the rank of the current secondary group;
  calculating a second similarity measurement as a function of the time value between the current secondary group and each of the secondary groups having a rank higher than the current rank remaining in the second ordered list;
  for each secondary group having a rank higher than the current rank the second similarity measurement of which is higher than a second predetermined similarity threshold, merging the secondary group with the current secondary group and removing the secondary group from the second ordered list;
 the tertiary groups are the secondary groups remaining in the second ordered list.

Thus, a second merging step is made by a second similarity measurement based on the secondary characteristics of the pulses.

Beneficially, the method according to a first aspect of the invention includes a step of managing the residues, the residues being defined as the pulses of a pulse block not belonging to any tertiary group.

Thus, the pulses having singular values which could belong to a radar signal and which have been rejected by the method in a first time are studied.

Beneficially, the step of processing the residues includes the following sub-steps of:
 for each tertiary group, calculating a primary histogram of each primary characteristic and a secondary histogram of each secondary characteristic;
 for each residue:
  calculating a matching score between the residue and each tertiary group as a function of its primary histograms and its secondary histograms;
  selecting the maximum matching score obtained;
  associating the residue with the tertiary group corresponding to the maximum matching score if the maximum matching score is above a first predetermined matching threshold;
  removing the residue if the maximum matching score is below the first matching threshold and above a second predetermined matching threshold;
 gathering the non-associated non-removed residues in a residue pulse block and making the same gathering steps to form residue tertiary groups.

Thus, three options are possible for each residue: if finally, its primary and secondary characteristics are close to those of a tertiary group, it is added to said tertiary group, if its primary and secondary characteristics are too far from those of all the tertiary groups, it is processed again, otherwise it is removed. The same steps as previously are thus made with a less demanding parameterisation to form residue tertiary groups.

Beneficially, the residue tertiary groups are gathered with the tertiary groups by making the same sub-steps as the production of the tertiary groups to obtain new tertiary groups.

Thus, the tertiary groups and tertiary groups of residues are gathered if they have time similarities, that is according to their secondary characteristics.

A second aspect of the invention relates to a device enabling the detection method according to a first aspect of the invention to be implemented, the device including:
an antenna array including at least one antenna able to receive and digitise acquisition signals to transmit them to a calculating unit as digitised signals.
a calculating unit able to make calculation and detection functions on digitised signals A third aspect of the invention relates to a computer program product including instructions which, when the program is executed by a computer, cause the same to implement the method according to a first aspect of the invention.

A fourth aspect of the invention relates to a non-transitory computer readable recording medium comprising instructions which, when executed by a computer, cause the same to implement the method according to a first aspect of the invention.

The invention and its different applications will be better understood upon reading the description that follows and upon examining the accompanying figures.

BRIEF DESCRIPTION OF THE FIGURES

The figures are shown by way of indicating and in no way limiting purposes of the invention.

FIG. 1 shows a schematic representation of the method according to a first aspect of the invention according to a first embodiment.

FIG. 2 shows a schematic representation of the device according to a second aspect of the invention.

FIG. 3 shows a schematic representation of the step of producing primary groups.

FIG. 4 shows a schematic representation of the partitioning operation.

FIG. 5 shows a schematic representation of the first iteration of the step of producing the secondary groups when there is a merging of primary groups.

FIG. 6A shows a histogram of the pulse time instant differences and FIG. 6B shows the operation of a radar corresponding to this histogram.

DETAILED DESCRIPTION

Figure 7:
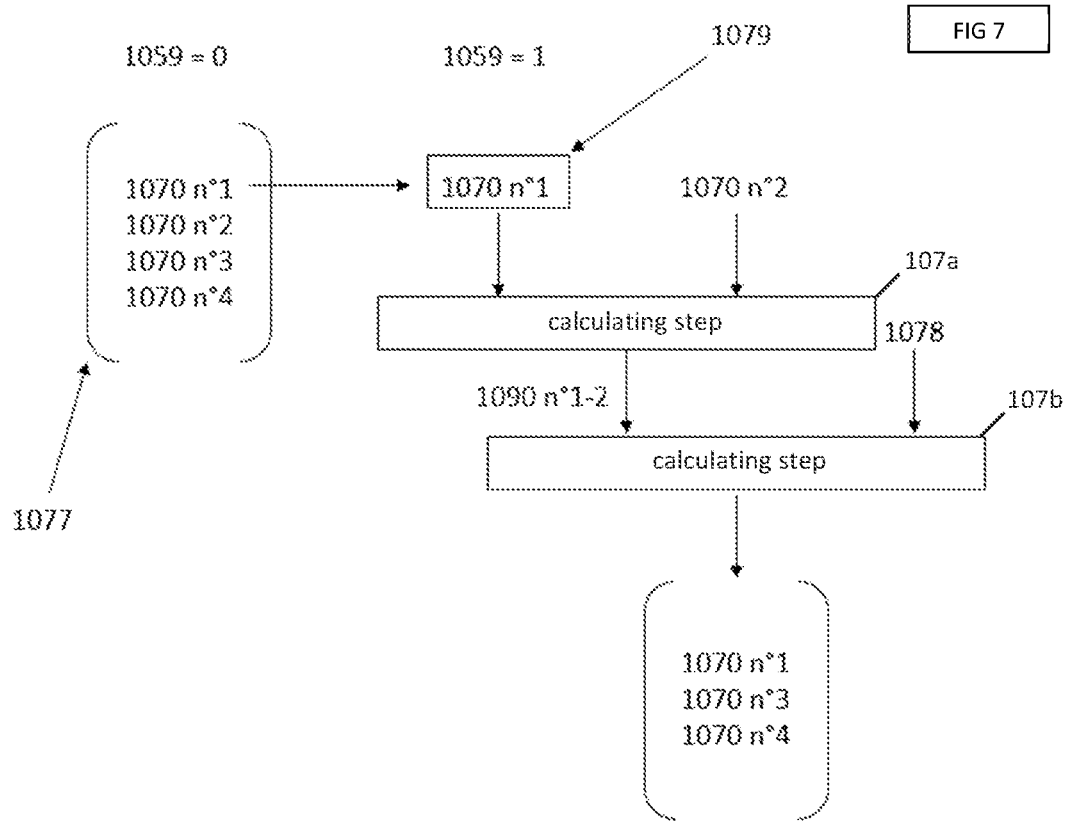
FIG. 7 shows a schematic representation of the first iteration of the step of producing the tertiary groups when there is a merging of secondary groups.

Unless otherwise set out, a same element appearing in different figures has a single reference.

A first aspect of the invention relates to a method 100 for detecting the presence of at least one radar 300 in an environment close to a device 200 according to a second aspect of the invention, enabling the detection method 100 to be implemented. By close environment, it is meant a circular zone surrounding the device 200 with a diameter of 50 kilometres.

In all the following, by radar, it will be meant a telecommunication electronic equipment which includes at least one transmitter which transmits signals as electromagnetic waves to detect the presence and determine the position, and possibly the speed, of objects such as airplanes or boats.

The method 100 according to a first aspect of the invention includes several steps the sequence of which is represented in FIG. 1. These steps are implemented by the device 200 according to a second aspect of the invention, represented in FIG. 2. The device 200 includes a calculating unit 201 making calculation steps 102 to 109 of the method 100 (calculation step 109) and an antenna array 202 making an acquisition and digitisation step 101.

The antenna array 202 includes at least one antenna 203. In FIG. 2, the antenna array 202 has six antennas 203 which sense at the same time acquisition signals 1010 from the close environment, that is each antenna 203 receives a different acquisition signal 1010 but the acquisition is simultaneously triggered by all the antennas 203. By one antenna 203, it is meant a device including one antenna element capable of sensing signals of its environment and an analogue-to-digital converter capable of digitising a signal. If the antenna array 202 includes a plurality of antennas 203, the acquisition signal 1010 received by each antenna 203 is then digitised such that all the acquisition signals 1010 received by the antennas 203 are simultaneously digitised. After digitising, each antenna 203 transmits the digitised signal 1020 obtained after digitising the acquisition signal 1010 to the calculating unit 201. In the present application, a calculating unit sends back to a device having storage means 204 and calculating and detecting means 205 on the digitised signals 1020. Storage means can for example be a hard disc, an SSD memory or a simple or gate Flash memory, either local or remote. Calculating and detection means can be a microprocessor or a programmable logic circuit such as an FPGA ("Field-Programmable Gate Array").

After receiving the digitised signals 1020, the calculating unit 201 implements the calculation steps 102 to 109 of the method 100.

The step of cutting off a digitised signal 1020 into pulses 1030 is different depending on whether the signal comes from a pulse radar or the signal comes from a continuous wave radar. Indeed, a pulse radar transmits a signal which already contains pulses 1030, therefore, it is easy to cut it off into pulses 1030 whereas the continuous wave radar transmits a continuous signal that has to be artificially cut off into pulses 1030. To artificially cut off a continuous signal into pulses 1030, a pulse 1030 may for example be considered as the value of this continuous signal on a certain time interval. The value of this time interval is for example 1 millisecond. In an embodiment, when the digitised signal 1020 has been artificially cut off, an artificial truncation piece of information is added to the pulse. By pulse, it is meant an abrupt signal variation with a return to the initial state.

Once the digitised signals 1020 are cut off into pulses 1030, each pulse 1030 is characterised to obtain primary characteristics 1031 and secondary characteristics 1032. The primary characteristics 1031 of a pulse 1030 can for example be the pulse frequency, pulse duration, pulse level, pulse direction of arrival or even the pulse internal modulation. The secondary characteristics 1032 of a pulse 1030 are time characteristics such as the pulse time instant, the pulse start or even the pulse end. The primary characteristics 1031 and secondary characteristics 1032 are obtained by known methods. For example, the pulse frequency may be obtained by calculating the signal spectrum and the direction of arrival by a goniometry algorithm if the antenna array 202 is comprised of several antennas 203.

After the step 102 of cutting off the digitised signals 1020 into pulses 1030 and characterising these pulses 1030 (cutting off and characterizing step 102), the pulses 1030 are gathered into pulse blocks 1040. By pulse block 1040, it is meant a set of pulses 1030 either limited in number, for example a pulse block 1040 contains 10 000 pulses 1030, or in time, for example a pulse block 1040 corresponds to one listening second. The pulse blocks 1040 may be of various and heterogeneous sizes. Generally, the more the pulse blocks 1040 contain pulses 1030, the easier to discriminate the radars 300 from the acquisition signal 1010.

After the step 103 of gathering the pulses 1030 into pulse blocks 1040 (gathering step 103), the calculation steps 104 to 109 are made for each pulse block 1040.

For each pulse block 1040, a step 104 of producing primary groups 1050 ($1^{st}$ producing step 104) is made: the principle is represented in FIG. 3. The primary groups 1050 are pulse sub-groups 1030 of a pulse block 1040, that is the primary groups 1050 each have a cardinal strictly lower than the cardinal of the pulse block 1040. By cardinal of a group, it is meant the number of elements of this group.

The production of the primary groups 1050 makes use of the primary characteristics 1031 of the pulses 1030 contained in the pulse block 1040 to divide the pulse block 1040 into different primary groups 1050 gathering pulses 1030 having close primary characteristics 1031.

The step 104 of producing the primary groups 1050 makes successive partitionings 1051, each partitioning 1051 being based on a single primary parameter 1031. A first partitioning 1051 is based on a first primary parameter 1051 chosen from the known primary parameters for each pulse 1030 of the pulse block 1040. The first partitioning 1051 makes a partitioning 1051 of the pulse block 1040 and forms first sub-groups or first partitions 1052 of the pulse block 1040, each first partition 1052 gathering the pulses 1030 of the pulse block 1040 having close first primary characteristics 1031. Successive partitionings 1051 are then made, each partitioning 1051 being based on a primary characteristics 1031 that has not previously been used to make a partition 1051 and partitioning the partitions 1052 formed in the previous partitioning step 1051. The number of partitionings 1051 made is equal to the number of primary caracteristics 1031. The first partitioning 1051 enables the succession of the partitionings 1051 to be initialised to form first partitions 1052 from the pulse block 1040. The operation of the partitions 1051 is pyramidal as illustrated in FIG. 3. Indeed, the first partitions 1051 n° 1 forms three first partitions 1052 n° 1-1, 1052 n° 1-2, 1052 n° 1-3. These three first partitions 1052 n° 1-1, 1052 n° 1-2, 1052 14 n° 1-3 will each form one or more second partitions 1052 after a second partitioning 1051 n° 2. The first partition 1052 n° 1-1 forms for example two second partitions 1052 n° 2-1, 1052 n° 2-2 which will themselves form three third partitions 1052 n° 3-1, 1052 n° 3-2, 1052 n° 3-3 after a third partitioning 1051 n° 3 and so on until a partitioning 1051 for each primary characteristic 1031 has been made. The last partitioning 1051 based on the last primary characteristic 1031 forms the primary groups 1050. In FIG. 3, the third partitioning 1052 n° 3 is the last partitioning, that is there are three primary characteristics 1031. The primary groups 1050 formed have various shapes. The primary characteristics 1031 are independent from each other, therefore the order of the primary parameters 1051 used has little influence on the final result of the method 100. A partitioning 1051 is made by a partitioning algorithm 1051 which classifies the pulses 1030 of a group according to a metrics depending on the primary characteristic 1031 on which the partitioning 1051 is based. The group may be the pulse block 1040 if the first partitioning is performed or a partition obtained during a previous partitioning. The principle of the partitioning 1051 is described in FIG. 4. For each pulse 1030 of the group, the partitioning algorithm 1051 calculates a distance value 1054 according to the metrics. After the pulses 1030 within an ordered list of pulses 1053 have been ordered, that is by assigning them a rank being defined for example, as an integer between 1 and the cardinal of the group, the partitioning algorithm 1051 provides an ordered sequence of distance values 1055 with a same cardinal as the ordered list of pulses 1053, giving to the rank i of the ordered sequence of distance values 1055, the distance value 1054 corresponding to the pulse 1030 assigned to the rank i in the ordered list of pulses 1053. For example, the pulse 1030 assigned to the rank 4 in the ordered list of pulses 1053 is associated with a distance value 1054 which is placed in the rank 4 of the ordered sequence of distance values 1055. The partitioning algorithm 1051 is for example the K-means algorithm, DBSCAN algorithm or OPTICS algorithm. For example, the OPTICS algorithm orders the pulses 1030 by neighbourhood and defines an increasing metrics called reachability-distance as a function of parameters to be adjusted.

The distance values 1054 of the ordered sequence of distance values 1055 are then drawn as a function of the rank of the distance values 1054 in the ordered sequence of distance values 1055, thus defining a function 1091. Generally, the function 1091 has some breaks that are with a major deviation between the primary characteristics 1031 of the pulses 1030 before the break and the primary characteristics 1031 of the pulses 1030 after the break and thus synonymous with a switch from a partition 1052 to another partition 1052. To automate the partitioning 1051 from the function 1091, the derivative 1056 of the function is drawn. The derivative 1056 has peaks at the breaks of the function 1091: by choosing an adapted derivative threshold 1057, the pulses 1030 are partitioned when the value of the derivative 1056 meets some predetermined condition with respect to the derivative threshold 1057. This condition is for example that the value of the derivative 1056 passes above the derivative threshold 1057 or even that the value of the derivative 1056 passes below the derivative threshold 1057. The value of the derivative 1056 for which the condition is met corresponds to a rank which corresponds in turn to a pulse 1030 which delimits the separation between two partitions 1052.

The step 104 of forming the primary groups 1050 is the longest step in terms of calculation time for the method 100. When a primary characteristic 1031 is discrete and uses a small sample of values, for example 10 values, it is possible to use a less complex partitioning algorithm 1051 to decrease the calculation time. A simple sorting can for example be made.

For each partition 1052 made, it is possible to define new metrics to characterise the partitions 1052. A partition centre 1051 or even a mean partition radius 1052 can for example be defined from the metrics of the partitioning algorithm 1051. These new metrics may for example be used to merge the partitions 1052 at the end of each partitioning step if the partitions 1052 meet conditions which depend on the new metrics. For example, two partitions 1052 having close partition centres are merged.

At the end of step 104 of producing the primary groups 1050, all the pulses 1030 of the pulse block 1040 are not included in the primary groups 1050. Indeed, some pulses 1030 have primary characteristics 1031 too far from the primary characteristics 1031 of the other pulses 1030 and therefore, they are discarded. The discarded pulses 1030 are called residues 1081 in the following.

Once the primary groups 1050 are produced, primary characteristics of primary groups 1060 are calculated. The primary characteristics of primary groups 1060 of a primary group 1050 are calculated from the primary characteristics 1031 of the pulses 1030 gathered in the primary group 1050. Thus, the primary characteristics of primary groups 1060 are for example the mean frequency defined as the mean of the pulse frequencies of the pulses 1030 gathered in the primary group 1050 or even the median intrapulse modulation defined as the median of the intrapulse modulations of the pulses 1030 gathered in the primary group 1050. In an embodiment, the number of primary characteristics of primary groups 1060 is equal to the number of primary characteristics 1031.

After the step 105 of calculating (calculating step 105) the primary characteristics of primary groups 1060, the primary groups 1050 are gathered to form secondary groups 1070. The secondary groups 1070 are groups formed by a primary group 1050 or by the union of a plurality of primary groups 1050.

The step 106 of producing the secondary groups 1070 ($2^{nd}$ producing step 106) is illustrated in FIG. 5 and is based on an iteration loop. Firstly, the primary groups 1050 are ordered within a first ordered list 1058 the cardinal of which is equal to the number of primary groups 1050, that is they are assigned a rank being defined for example, as an integer between 1 and the number of primary groups 1050. The first ordered list 1058 is for example ordered by increasing rank. In FIG. 5, the first ordered list 1058 contains four primary groups 1050 n° 1, 1050 n° 2, 1050 n° 3, 1050 n° 4 having respectively 1, 2, 3, 4 as a rank.

Then, an iteration control variable called a current rank 1059 is initialised at the value 0. The current rank 1059 is stored in a zone of the storage means 204 dedicated to the iteration control. The primary group 1050 the rank of which is the closest to the current rank 1059 but is not equal to the current rank 1059 becomes the current primary group 1076 and the rank of the current primary group 1076 is assigned to the current rank 1059.

A first similarity measurement 1051 is then calculated between the current primary group 1076 and all the other primary groups 1050 of the first ordered list 1058, that is the primary groups 1050 having a rank strictly higher than the current rank 1059. The first similarity measurement 1051 depends on the primary characteristics of primary groups 1060. The first similarity measurement 1051 is for example a sum of terms each term of which depends on a single primary characteristic of primary groups 1060, each term being 1 if the difference between the primary characteristics of primary groups of two primary groups 1050 which are compared is higher than some tolerance threshold and being 0 otherwise. For example, a tolerance threshold of 3 MHz may be chosen for the mean frequency if it is used as a primary characteristic of primary groups 1060. The primary groups 1050 having a rank higher than the current rank 1059 and having a first similarity measurement 1051 higher than a first similarity threshold 1052 with the current primary group 1076 are merged with the current primary group 1076, that is all the pulses 1030 gathered within the primary groups 1050 merged are gathered with the pulses 1030 of the current primary group 1076. These primary groups are then removed from the first ordered list 1058.

In FIG. 5, the primary group with the rank 1 1050 n° 1 is chosen as the current primary group 1076 since the current rank 1059 is initially 0. The current rank 1059 then takes the value 1. In FIG. 5, the current primary group 1076 is compared with the primary group with the rank 2 1050 n° 2 of the first ordered list 1058. The step 105a of calculating the first similarity measurement 1051 (calculating step 105a) gives the first similarity measurement 1051 n° 1-2 between the current primary group 1050 n° 1 and the primary group with the rank 2 1050 n° 2. The step 105b of comparing between the first similarity measurement 1051 n° 1-2 and the first similarity threshold 1052 (comparing step 105b) gives the first ordered list 1058 obtained after the current primary group 1050 n° 1 and the primary group with the rank 2 1050 n° 2 have been merged or not. In FIG. 5, the current primary group 1050 n° 1 and the primary group with the rank 2 1050 n° 2 are merged within the primary group with the rank 1 1050 n° 1 and the primary group with the rank 2 1050 n° 2 is removed from the first ordered list 1058. The next step not represented in FIG. 5 is making the steps 105a-105b of calculating the first similarity measurement 1051 and comparing between the current primary group 1050 n° 1 and the remaining primary groups 1050 n° 3, 1050 n° 4 in the first ordered list 1058. If at the end of these steps 105a-105b, the current primary group 1050 n° 1 has not been merged with the remaining primary groups 1050 n° 3, 1050 n° 4 in the first ordered list 1058, the current primary group 1050 n° 1 becomes a secondary group 1070 and the primary group with the rank 3 1050 n° 3 becomes the current primary group 1076. The current rank 1059 is then assigned to the value 3. It is continued as long as primary groups 1050 having a rank higher than the current rank 1059 remain in the first ordered list 1058.

When the iteration loop is stopped, the primary groups 1050 of the first ordered list 1058 are the secondary groups 1070.

It will be appreciated that there is a plurality of iteration loops that can describe the same general principle as that described in the loop suggested, that is merging the similar primary groups 1050, the similarity being defined by comparison between a first similarity measurement 1051 and a first similarity threshold 1052 and the first similarity measurement 1051 being defined from the primary characteristics of primary groups 1060. For example, it would have been possible to initialise the current rank 1059 to the cardinal of the first ordered list 1058 and to make the steps as long as primary groups 1050 having a rank lower than the current rank 1059 remain in the first ordered list 1058.

After the step 106 of producing the secondary groups 1070, the secondary groups 1070 are gathered to form tertiary groups 1080. The tertiary groups 1080 are groups formed by a secondary group 1070 or by the union of a plurality of secondary groups 1070. The step 107 of producing the tertiary groups 1080 producing step 107) uses the ($3^{rd}$ secondary characteristics 1032 of the pulses 1030 gathered in the tertiary groups 1080 and in particular the pulse time instants.

For each secondary group 1070, a histogram of the pulse time instant differences 1071 is produced. A pulse time instant difference is the absolute value of the deviation between two pulse time instants. To calculate the pulse time instant differences and make the histogram of the pulse time instant differences, the pulse time instants are sorted by increasing order. A pulse time instant difference is then calculated between each pulse time instant and the pulse time instant which is immediately higher thereto. For example, if there are four pulse time instants sorted by increasing order, a pulse time instant difference is made between the first pulse time instant and the second pulse time instant, between the third pulse time instant and the second pulse time instant and then between the fourth pulse time instant and the third pulse time instant. The histogram of the pulse time instant differences 1071 represents the occurrence of the pulse time instant differences on a plurality of time intervals called bins 1072. For example, if the histogram of the pulse time instant differences 1071 includes N bins 1072, the value of the time interval corresponding to the bin n° 11072 is written as:

$$\left[\Delta t_{min} + \frac{\Delta t_{max} - \Delta t_{min}}{N} \times (i-1); \Delta t_{min} + \frac{\Delta t_{max} - \Delta t_{min}}{N} \times i\right[$$

with $\Delta t_{min}$ the smallest value of pulse time instant difference among the values of pulse time instant difference of all the pulses 1030 gathered in the secondary group 1070 and $\Delta t_{max}$ the greatest value of pulse time instant difference among the values of pulse time instant difference of all the pulses 1030 gathered in the secondary group 1070.

The analysis of the histogram of the pulse time instant differences 1071 consists in determining whether there is a periodic pattern in the activity of the secondary group 1070. It is considered that the secondary group 1070 has a periodicity when the secondary group 1070 includes delimited active periods interspersed with quiet periods and that the quiet periods are at least as long as the active periods as represented in FIG. 6B. This behaviour type is peculiar to a scanning radar with a scanning period. A secondary group 1070 having a periodicity has a histogram of the pulse time instant differences 1071 the first half of the bins 1072 of which has non-null occurrences and the second half 1073 of the bins 1072 of which has quasi-null occurrences except for the very last bin 1074. By a quasi-null occurrence, it is meant an occurrence negligible with respect to the occurrence of the last bin 1074, for example an occurrence lower than or equal to 1. FIG. 6A shows a histogram of the pulse time instant differences 1071 having a periodicity.

From the last bin 1074 of a histogram of the pulse time instant differences 1071 having a periodicity, it is possible to estimate a time value 1075 as the scanning period. The time value 1075 estimated is the time interval corresponding to the last bin 1074. From the time value 1075 estimated, it is possible to determine other time values as for example the time intervals of the active periods of the radar or the number of active periods.

The production of the tertiary groups 1080 is thereby made according to the same steps as the production of the secondary groups 1070. The step 107 of producing the tertiary groups 1080 is illustrated in FIG. 7 and is based on an iteration loop. Firstly, the secondary groups 1070 are ordered within a second ordered list 1077 the cardinal of which is equal to the number of secondary groups 1070, that is a rank defined for example, as an integer between 1 and the number of secondary groups 1070 is assigned thereto. The second ordered list 1077 is for example ordered by increasing rank. In FIG. 7, the second ordered list 1077 contains four secondary groups 1070 n° 1, 1070 n° 2, 1070 n° 3, 1070 n° 4 having respectively 1, 2, 3, 4 as a rank.

Then, the current rank 1059 is initialised to the value 0. The secondary group 1070 the rank of which is closest to the current rank 1059 but is not equal to the current rank 1059 becomes the current secondary group 1079 and the rank of the current secondary group 1079 is assigned to the current rank 1059.

A second similarity measurement 1090 is then calculated between the current secondary group 1079 and all the other secondary groups 1070 of the second ordered list 1077, that is the secondary groups 1070 having a rank strictly higher than the current rank 1059. The second similarity measurement 1090 depends on the time value 1075 estimated and, for example, on other time values determined from the time value 1075 as the number of active periods. The second similarity measurement 1090 is for example a sum of terms each term of which depends on a single time value 1032. The secondary groups 1070 having a rank higher than the current rank 1059 and having a second similarity measurement 1090 higher than a second similarity threshold 1078 with the current secondary group 1079 are merged with the current secondary group 1079, that is all the pulses 1030 gathered within the secondary groups 1070 merged are gathered with the pulses 1030 of the current secondary group 1079. These secondary groups are then removed from the second ordered list 1077.

In FIG. 7, the secondary group with the rank 1 1070 n° 1 is chosen as the current secondary group 1079 since the current rank 1059 is initially 0. The current rank 1059 thereby takes the value 1. In FIG. 7, the current secondary group 1079 is compared with the secondary group with the rank 2 1070 n° 2 of the second ordered list 1077. The step 107a of calculating the second similarity measurement 1090 (calculating step 107a) gives the second similarity measurement 1090 n° 1-2 between the current secondary group 1070 n° 1 and the secondary group with the rank 2 1070 n° 2. The step 107b of comparing between the second similarity measurement 1090 n° 1-2 and the second similarity threshold 1078 (comparing step 107b) gives the second ordered list 1077 obtained after the current secondary group 1070 n° 1 and the secondary group with the rank 2 1070 n° 2 have been merged or not. In FIG. 7, the current secondary group 1070 n° 1 and the secondary group with the rank 2 1070 n° 2 are merged within the secondary group with the rank 1 1070 n° 1 and the secondary group with the rank 2 1070 n° 2 is removed from the second ordered list 1077. The next step not represented in FIG. 7 is to make the steps 107a-107b of calculating the second similarity measurement 1090 and comparing between the current secondary group 1070 n° 1 and the remaining secondary groups 1070 n° 3, 1070 n° 4 in the second ordered list 1077. If at the end of these steps 107a-107b, the current secondary group 1070 n° 1 has not been merged with the remaining secondary groups 1070 n° 3, 1070 n° 4 in the second ordered list 1077, the current secondary group 1070 n° 1 becomes a tertiary group 1090 and the secondary group with the rank 3 1070 n° 3 becomes the current secondary group 1079. The current rank 1059 is thereby assigned to the value 3. It is continued as long as secondary groups 1070 having a rank higher than the current rank 1059 remain in the second ordered list 1058.

When the iteration loop is stopped, the secondary groups 1070 of the second ordered list 1058 are the tertiary groups 1090.

It will be appreciated that there is a plurality of iteration loops that can describe the same general principle as that described in the loop suggested, that is merging the similar secondary groups 1070, the similarity being defined by comparing between a second similarity measurement 1090 and a second similarity threshold 1078 and the second similarity measurement 1090 being defined from the time values 1075 estimated. It would be for example possible to initialise the current rank 1059 to the cardinal of the second ordered list 1077 and to make the steps as long as secondary groups 1070 having a rank lower than the current rank 1059 remain in the second ordered list 1077.

After the step 107 of producing the tertiary groups 1080, the tertiary groups 1080 containing a number of pulses 1030 below a limit number are removed. The limit number is for example 1% of the number of pulses 1030 in the pulse block 1040. The pulses 1030 contained in the tertiary groups 1080 removed are added to the residues 1081.

Figure 8:
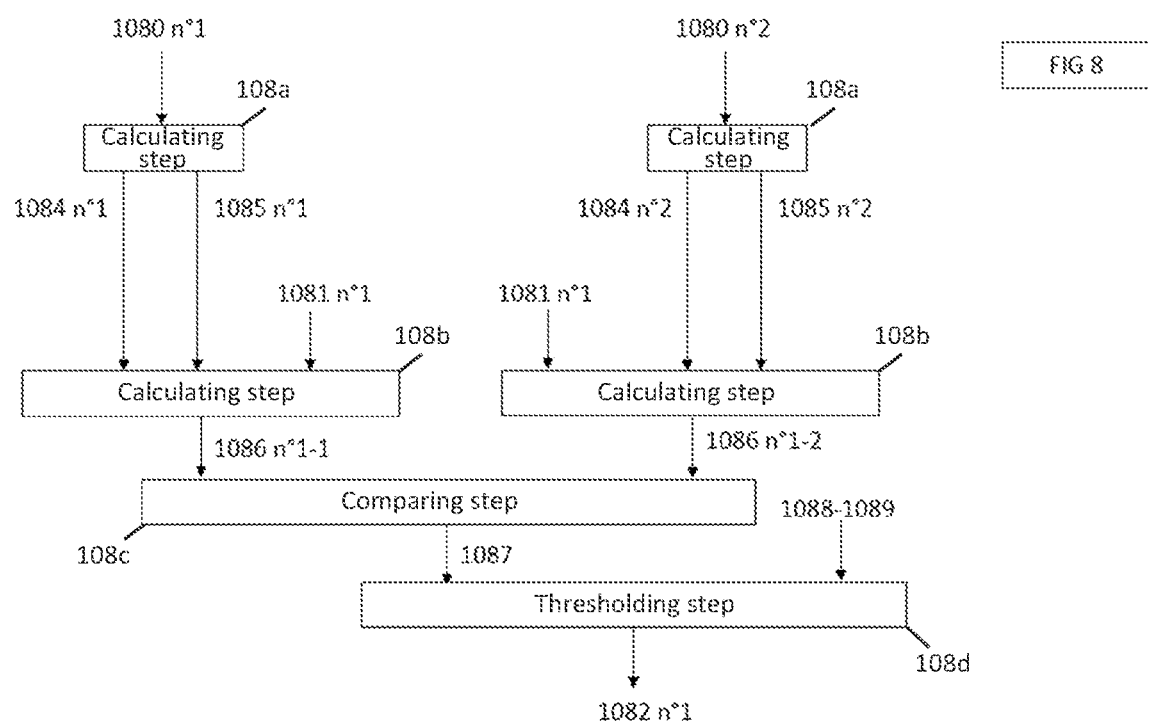
FIG. 8 shows a schematic representation of the step of processing the residues for a residue in the case where the residue is neither associated, nor removed.

According to a first embodiment, the method 100 includes a step 108 of processing the residues 1081 (processing step 108) the principle of which is illustrated in FIG. 8.

For each residue 1081, three actions can be made: either the residue 1081 is associated with an already existing tertiary group 1080, or the residue 1081 undergoes further processings, or the residue 1081 is ultimately rejected.

To determine which action has to be undertaken for each residue 1081, for each tertiary group 1080, a primary histogram 1084 of each primary characteristic 1031 and a secondary histogram 1085 of each secondary characteristic 1032 are calculated. Each tertiary group 1080 is associated with a number of primary histograms 1084 corresponding to the number of primary characteristics 1031 and a number of secondary histograms 1085 corresponding to the number of secondary characteristics 1032. A primary histogram 1084 is for example a frequency histogram.

After the step 108*a* of calculating the primary histograms 1084 and the secondary histograms 1085 (calculating step 108*a*), for each residue 1081, a matching score 1086 is calculated between the residue 1081 and each tertiary group 1080. Each matching score 1086 depends on the primary histograms 1084 and secondary histograms 1085 of the tertiary group the matching score of which is calculated. The matching score 1086 is for example a sum of terms each term of which depends on a single primary histogram 1084 or a single secondary histogram 1085. For example, a term depending on a primary histogram 1084 is 0 if the primary characteristic 1031 corresponding to the primary histogram 1084 of the residue 1081 cannot be positioned in the primary histogram 1085 and is a tolerance value taking account of the difference between the primary characteristic 1031 and the occurrence of the primary histogram 1085 corresponding to a value closest to the primary characteristic 1031.

For each residue 1081, several matching scores 1086 the number of which is equal to the number of tertiary groups 1080 are calculated. In FIG. 8, two matching scores 1086 n° 1-1, 1086 n° 1-2 respectively corresponding to the tertiary group 1080 n° 1 and 1080 n° 2 are calculated.

After the step 108*b* of calculating matching scores 1086 (calculating step 108*b*), a step 108*c* of comparing matching scores 1086 (comparing step 108*c*) gives the matching score 1086 having the greatest value, that is the maximum matching score 1087.

Then, a thresholding step 108*d* (thresholding step 108*d*) compares the maximum matching score 1087 with a first matching threshold 1088 and a second matching threshold 1089, the second matching threshold 1089 having a value strictly lower than the first matching threshold 1089. If the maximum matching score 1087 is above the first matching threshold 1088, the residue 1081 is associated with the tertiary group 1080 corresponding to the maximum matching score 1087. If the maximum matching score 1087 is below the second matching threshold 1089, the residue 1081 undergoes new processings. If the maximum matching score 1087 is between the first matching threshold 1088 and the second matching threshold 1089, the residue 1081 is removed.

All the residues 1082 the maximum matching scores 1087 of which are below the second matching threshold 1089 are gathered in a new pulse block 1041 which undergoes the same steps as the pulse block 1040 but with a different parameterisation until residue tertiary groups 1083 are obtained. In an embodiment, the new parameterisation chosen is less demanding than the previous parameterisation, that is the new parameterisation is chosen to enable groups the pulses 1030 of which share less similarity than in the groups created with the previous parameterisation to be created. For example, the similarity threshold values are lower. That enables potential radars 300 having few pulses 1030 to be found.

After the step 108 of managing the residues 1081, a new step of producing the tertiary groups 1080 is made as illustrated in FIG. 7 but considering the tertiary groups 1080 and the residue tertiary groups 1081 as secondary groups 1070. New tertiary groups 1080 are thus obtained. Each final tertiary group 1080 is considered as being a radar 300 or a radar mode. Thereby, it is easy to estimate the number of radars 300 that emitted during the acquisition. Each tertiary group 1080 gathers the pulses 1030 associated with a radar 300 or a radar mode: these pulses 1030 can then be characterised to determine the parameters of the radar 300 or the radar mode as for example frequency, duration or direction of arrival for the pulses. These parameters can thereafter enable the radar 300 to be identified if the same is already recorded in a database or the database to be enriched by adding a new radar 300.

According to a second embodiment, the method 100 does not include a step 108 of processing the residues 1081 and the tertiary groups 1080 obtained at the end of the first step 107 of producing the tertiary groups 1080 directly give the radars 300 or radar modes.

Having described and illustrated the principles of the invention with reference to various embodiments, it will be recognized that the various embodiments can be modified in arrangement and detail without departing from such principles. It will be appreciated that the different concepts and aspects of the invention described above can be implemented, for example, using one or more processors, modules, machine executable instructions, computers and/or servers. It should be understood that the concepts and aspects of the invention described herein are not related or limited to any particular type of computing environment, unless indicated otherwise. Various types of specialized computing environments may be used with or perform operations in accordance with the teachings described herein. Elements of embodiments shown in software may be implemented in hardware and vice versa.

One or more devices, processors or processing devices may be configured to carry out the function(s) of each of the elements and modules of the structural arrangement described herein. For example, the one or more devices, processors or processing devices may be configured to execute one or more sequences of one or more machine executable instructions contained in a main memory to implement the method(s) or function(s) described herein. Execution of the sequences of instructions contained in a main memory causes the processors to perform at least some of the process steps or function(s) of the elements described herein. One or more processors in a multi-processing arrangement may also be employed to execute the sequences of instructions contained in a main memory or computer-readable medium. In alternative embodiments, hard-wired circuitry may be used in place of or in combination with software instructions. Thus, embodiments are not limited to any specific combination of hardware circuitry and software. The term "computer-readable medium" as used herein refers to any medium that participates in providing instructions to a processor for execution. Such a medium is non-transitory and may take many forms, including but not limited to, non-volatile media, volatile media, and transmission media. Non-volatile media include, for example, optical or magnetic disks. Volatile media include dynamic memory. Transmission media include coaxial cables, copper wire and fiber optics. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read. Various forms of computer readable media may be involved in carrying one or more sequences of one or more instructions to processor for execution.

Computer programs comprising machine executable instructions for implementing at least one of the steps of the methods, and/or aspects and/or concepts of the invention described herein or function(s) of various elements of the structural arrangement described herein can be implemented by one or more computers comprising at least an interface, a physical processor and a non-transitory memory (also broadly referred to as a non-transitory machine readable or storage medium). The computer is a special purpose computer as it is programmed to perform specific steps of the method(s) described above. The non-transitory memory is encoded or programmed with specific code instructions for carrying out the above method(s) and its/their associated steps. The non-transitory memory may be arranged in communication with the physical processor so that the physical processor, in use, reads and executes the specific code instructions embedded in the non-transitory memory. The interface of the special purpose computer may be arranged in communication with the physical processor and receives input parameters that are processed by the physical processor.

It will be appreciated by one skilled in the art that the disclosed arrangements and methods described herein represent a solution to the technological problem described above.

The invention claimed is:

1. A method for detecting at least one radar in an environment, the method being implemented by a device including a calculating unit and an antenna array including at least one antenna coupled to an analogue-to-digital converter adapted to digitize a signal, the at least one antenna coupled to said analogue-to-digital converter being adapted to make acquisitions of the environment as acquisition signals and to receive and transmit the acquisition signals in a digital form to the calculating unit, the calculating unit being adapted to make processing on digitized signals, the method comprising:

receiving and digitizing the acquisition signals as digitized signals and transmitting the digitized signals to the calculating unit;

obtaining pulses from said digitized signals, characterising each pulse of said pulses to obtain primary characteristics and secondary characteristics;

gathering the pulses into pulse blocks;

for each pulse block of said pulse blocks:
  gathering the pulses as a function of their primary characteristics and producing primary groups;
  for each primary group of said primary groups:
    calculating primary characteristics of the pulses gathered in the primary group;
  gathering the primary groups as a function of the primary characteristics of primary groups and producing secondary groups,
    wherein said producing the secondary groups includes:
    ordering the primary groups within a first ordered list, each primary group having a rank in the first ordered list, the rank from each primary group being chosen arbitrarily increasing and higher than or equal to 1;
    assigning a current rank to 0;
    as long as primary groups having a rank higher than the current rank remain in the first ordered list:
      selecting the primary group the rank of which is closest to the current rank without being equal to the current rank such that it becomes a current primary group and assigning to the current rank the rank of the current primary group;
      calculating a first similarity measurement as a function of the primary characteristics of primary groups between the current primary group and each of the primary groups having a rank higher than the current rank remaining in the first ordered list;
      for each primary group having a rank higher than the current rank the first similarity measurement of which is higher than a first predetermined similarity threshold, merging the primary group with the current primary group and removing the primary group from the first ordered list;
      the secondary groups are the primary groups remaining in the first ordered list;
  gathering the secondary groups as a function of secondary characteristics of the pulses gathered in each secondary group and producing tertiary groups;
  detecting at least one radar, each tertiary group being considered as a radar or a radar mode.

2. The method of detecting according to claim 1, wherein the primary characteristics of a pulse are chosen from at least a group comprising: pulse frequency, pulse duration, pulse level, pulse direction of arrival and pulse internal modulation.

3. The method of detecting according to claim 1, wherein said producing the primary groups includes:

for a first primary characteristic selected from the primary characteristics, producing at least one partition of the pulse block by implementing a partitioning algorithm;

for each primary characteristic different from the first primary characteristic and for which no partition has been produced, producing at least one partition of each partition obtained for a previous primary characteristic by implementing the partitioning algorithm, the primary groups being the partitions obtained for a last primary characteristic of said primary characteristics.

4. The method of detecting according to claim 3, wherein the partitioning algorithm uses a metrics based on a primary characteristic of used of the primary characteristics and produces an ordered list of pulses, each pulse being associated with a value according to said metrics as an ordered sequence of values, the ordered sequence of values obtained being then considered as a function, a separation between two partitions being made at a pulse for which the value of a derivative of said function meets a predetermined condition relating to a predetermined derivative threshold.

5. The method of detecting according to claim 1, wherein the primary characteristics of primary groups of a primary group are calculated by averaging values of the primary characteristics of the pulses gathered in the primary group.

6. The method of detecting according to claim 1, wherein the secondary characteristics of a pulse include a pulse time instant.

7. The method of detecting according to claim 6, wherein said producing the tertiary groups includes:
for each secondary group:
making a histogram of pulse time instant differences of the pulses of the secondary group, which histogram of the pulse time instant differences represents an occurrence of the pulse time instant differences on a plurality of time intervals called bins;
if all the occurrences in a second half of the histogram of the pulse time instant differences are quasi-null except for the occurrence of a last bin, estimating a time value characterising the secondary group;
ordering the secondary groups within a second ordered list, each secondary group having a rank in the second ordered list, the ranks being chosen arbitrarily increasing and higher than or equal to 1;
assigning the current rank to 0;
as long as secondary groups having a rank higher than the current rank remain in the second ordered list:
selecting the secondary group the rank of which is the closest to the current rank without being equal to the current rank such that it becomes the current secondary group and assigning to the current rank the rank of the current secondary group;
calculating a second similarity measurement as a function of the time value between the current secondary group and each of the secondary groups having a rank higher than the current rank remaining in the second ordered list;
for each secondary group having a rank higher than the current rank the second similarity measurement of which is higher than a second predetermined similarity threshold, merging the secondary group with the current secondary group and removing the secondary group from the second ordered list;
the tertiary groups are the secondary groups remaining in the second ordered list.

8. The method of detecting according to claim 1, further comprising processing residues, the residues being defined as the pulses of a pulse block not belonging to any tertiary group which were discarded because having primary characteristics too far from the primary characteristics of other pulses.

9. The method of detecting according to claim 8, wherein processing the residues includes:
for each tertiary group, calculating a primary histogram of each primary characteristic and a secondary histogram of each secondary characteristic;
for each residue:
calculating a matching score between the residue and each tertiary group as a function of its primary histograms and its secondary histograms;
selecting a maximum matching score obtained;
associating the residue with the tertiary group corresponding to the maximum matching score if the maximum matching score is above a first predetermined matching threshold;
removing the residue if the maximum matching score is below the first matching threshold and above a second predetermined matching threshold;
gathering non-associated non-removed residues in a residue pulse block, for each residue pulse block
gathering the pulses as a function of their primary characteristics and producing primary groups;
for each primary group of said primary groups:
calculating primary characteristics of the pulses gathered in the primary group;
gathering the primary groups as a function of the primary characteristics of primary groups and producing secondary groups;
gathering the secondary groups as a function of secondary characteristics of the pulses gathered in each secondary group and producing residue tertiary groups.

10. The method of detecting according to claim 9, wherein the residue tertiary groups are gathered with the tertiary groups, therein producing new tertiary groups by
for each residue tertiary group:
making a histogram of pulse time instant differences of the pulses of the residue tertiary group, which histogram of the pulse time instant differences represents an occurrence of the pulse time instant differences on a plurality of time intervals called bins;
if all the occurrences in a second half of the histogram of the pulse time instant differences are quasi-null except for the occurrence of a last bin, estimating a time value characterizing the residue tertiary group;
ordering the residue tertiary groups within a second ordered list, each residue tertiary group having a rank in the second ordered list, the ranks being chosen arbitrarily increasing and higher than or equal to 1;
assigning the current rank to 0;
as long as residue tertiary groups having a rank higher than the current rank remain in the second ordered list:
selecting the residue tertiary group the rank of which is the closest to the current rank without being equal to the current rank such that it becomes the current residue tertiary group and assigning to the current rank the rank of the current residue tertiary group;
calculating a second similarity measurement as a function of the time value between the current residue tertiary group and each of the residue tertiary groups having a rank higher than the current rank remaining in the second ordered list;
for each residue tertiary group having a rank higher than the current rank the second similarity measurement of which is higher than a second predetermined similarity threshold, merging the residue tertiary group with the current residue tertiary group and removing the residue tertiary group from the second ordered list;
the new tertiary groups are the residue tertiary groups remaining in the second ordered list.

11. A device for implementing a method for detecting at least one radar in an environment, the device comprising:
an antenna array including at least one antenna coupled to an analogue-to-digital converter adapted to digitize a signal, the at least one antenna coupled to said analogue-to-digital converter being adapted to receive and digitize acquisition signals to transmit them to a calculating unit as digitized signals, and a calculating unit adapted to make calculation and detection functions on digitized signals, the calculating unit being configured to obtain pulses from the digitized signals, characterise each pulse of said pulses to obtain primary characteristics and secondary characteristics;

gather the pulses into pulse blocks;

for each pulse block of said pulse blocks:

gather the pulses as a function of their primary characteristics to produce primary groups;

for each primary group of said primary groups:

calculate primary characteristics of said primary groups from the primary characteristics of the pulses gathered in the primary group;

gather the primary groups as a function of the primary characteristics of primary groups to produce secondary groups;

wherein the calculating unit is further configured to:

order the primary groups within a first ordered list, each primary group having a rank in the first ordered list, the rank from each primary group being chosen arbitrarily increasing and higher than or equal to 1;

assign a current rank to 0;

as long as primary groups having a rank higher than the current rank remain in the first ordered list:

select the primary group the rank of which is closest to the current rank without being equal to the current rank such that it becomes a current primary group and assign to the current rank the rank of the current primary group;

calculate a first similarity measurement as a function of the primary characteristics of primary groups between the current primary group and each of the primary groups having a rank higher than the current rank remaining in the first ordered list;

for each primary group having a rank higher than the current rank the first similarity measurement of which is higher than a first predetermined similarity threshold, merge the primary group with the current primary group and remove the primary group from the first ordered list;

the secondary groups are the primary groups remaining in the first ordered list;

gather the secondary groups as a function of secondary characteristics of the pulses gathered in each secondary group to produce tertiary groups;

detect at least one radar, each tertiary group being considered as a radar or a radar mode.

12. A non-transitory computer-readable recording medium comprising instructions which, when executed by a computer, cause the instructions to implement a method for detecting at least one radar in an environment, the method being implemented by a device including a calculating unit and an antenna array including at least one antenna coupled to an analogue-to-digital converter adapted to digitize a signal, the at least one antenna coupled to said analogue-to-digital converter being adapted to make acquisitions of the environment as acquisition signals and to receive and transmit the acquisition signals in a digital form to the calculating unit, the calculating unit being adapted to make processing on digitized signals, the method comprising:

receiving and digitizing the acquisition signals as digitized signals and transmitting the digitized signals to the calculating unit;

obtaining pulses from the digitized signals, characterising each pulse of said pulses to obtain primary characteristics and secondary characteristics;

gathering the pulses into pulse blocks;

for each pulse block of said pulse blocks:

gathering the pulses as a function of their primary characteristics and producing primary groups;

for each primary group of said primary groups:

calculating primary characteristics of the pulses gathered in the primary group;

gathering the primary groups as a function of the primary characteristics of primary groups and producing secondary groups;

wherein said producing of the secondary groups includes:

ordering the primary groups within a first ordered list, each primary group having a rank in the first ordered list, the rank from each primary group being chosen arbitrarily increasing and higher than or equal to 1;

assigning a current rank to 0;

as long as primary groups having a rank higher than the current rank remain in the first ordered list:

selecting the primary group the rank of which is closest to the current rank without being equal to the current rank such that it becomes a current primary group and assigning to the current rank the rank of the current primary group;

calculating a first similarity measurement as a function of the primary characteristics of primary groups between the current primary group and each of the primary groups having a rank higher than the current rank remaining in the first ordered list;

for each primary group having a rank higher than the current rank the first similarity measurement of which is higher than a first predetermined similarity threshold, merging the primary group with the current primary group and removing the primary group from the first ordered list;

the secondary groups are the primary groups remaining in the first ordered list:

gathering the secondary groups as a function of secondary characteristics of the pulses gathered in each secondary group and producing tertiary groups;

detecting at least one radar, each tertiary group being considered as a radar or a radar mode.

13. A method for detecting at least one radar in an environment, the method being implemented by a device including a calculating unit and an antenna array including at least one antenna coupled to an analogue-to-digital converter adapted to digitize a signal, the at least one antenna coupled to said analogue-to-digital converter being adapted to make acquisitions of the environment as acquisition signals and to receive and transmit the acquisition signals in a digital form to the calculating unit, the calculating unit being adapted to make processing on digitized signals, the method comprising:

receiving and digitizing the acquisition signals as digitized signals and transmitting the digitized signals to the calculating unit;

obtaining pulses from said digitized signals, characterising each pulse of said pulses to obtain primary characteristics and secondary characteristics;
gathering the pulses into pulse blocks;
for each pulse block of said pulse blocks:
  gathering the pulses as a function of their primary characteristics and producing primary groups;
  for each primary group of said primary groups:
    calculating primary characteristics of the pulses gathered in the primary group;
  gathering the primary groups as a function of the primary characteristics of primary groups and producing secondary groups,
  gathering the secondary groups as a function of secondary characteristics of the pulses gathered in each secondary group and producing tertiary groups,
  wherein said producing the tertiary groups includes:
    for each secondary group:
      making a histogram of pulse time instant differences of the pulses of the secondary group, which histogram of the pulse time instant differences represents an occurrence of the pulse time instant differences on a plurality of time intervals called bins;
      if all the occurrences in a second half of the histogram of the pulse time instant differences are quasi-null except for the occurrence of a last bin, estimating a time value characterising the secondary group;
    ordering the secondary groups within a second ordered list, each secondary group having a rank in the second ordered list, the ranks being chosen arbitrarily increasing and higher than or equal to 1;
    assigning a current rank to 0;
    as long as secondary groups having a rank higher than the current rank remain in the second ordered list:
      selecting the secondary group the rank of which is closest to the current rank without being equal to the current rank such that it becomes the current secondary group and assigning to the current rank the rank of the current secondary group;
      calculating a second similarity measurement as a function of the time value between the current secondary group and each of the secondary groups having a rank higher than the current rank remaining in the second ordered list;
      for each secondary group having a rank higher than the current rank the second similarity measurement of which is higher than a second predetermined similarity threshold,
        merging the secondary group with the current secondary group and removing the secondary group from the second ordered list;
    the tertiary groups are the secondary groups remaining in the second ordered list;
  detecting at least one radar, each tertiary group being considered as a radar or a radar mode.

14. A method for detecting at least one radar in an environment, the method being implemented by a device including a calculating unit and an antenna array including at least one antenna coupled to an analogue-to-digital converter adapted to digitize a signal, the at least one antenna coupled to said analogue-to-digital converter being adapted to make acquisitions of the environment as acquisition signals and to receive and transmit the acquisition signals in a digital form to the calculating unit, the calculating unit being adapted to make processing on digitized signals, the method comprising:
  receiving and digitizing the acquisition signals as digitized signals and transmitting the digitized signals to the calculating unit;
  obtaining pulses from said digitized signals, characterising each pulse of said pulses to obtain primary characteristics and secondary characteristics;
  gathering the pulses into pulse blocks;
  for each pulse block of said pulse blocks:
    gathering the pulses as a function of their primary characteristics and producing primary groups;
    for each primary group of said primary groups:
      calculating primary characteristics of the pulses gathered in the primary group;
    gathering the primary groups as a function of the primary characteristics of primary groups and producing secondary groups,
    gathering the secondary groups as a function of secondary characteristics of the pulses gathered in each secondary group and producing tertiary groups,
    detecting at least one radar, each tertiary group being considered as a radar or a radar mode;
  processing residues, the residues being defined as the pulses of a pulse block not belonging to any tertiary group which were discarded because having primary characteristics too far from the primary characteristics of other pulses;
  wherein processing the residues includes:
    for each tertiary group, calculating a primary histogram of each primary characteristic and a secondary histogram of each secondary characteristic;
    for each residue:
      calculating a matching score between the residue and each tertiary group as a function of its primary histograms and its secondary histograms;
      selecting a maximum matching score obtained;
      associating the residue with the tertiary group corresponding to the maximum matching score if the maximum matching score is above a first predetermined matching threshold;
      removing the residue if the maximum matching score is below the first matching threshold and above a second predetermined matching threshold;
    gathering non-associated non-removed residues in a residue pulse block, for each residue pulse block
      gathering the pulses as a function of their primary characteristics and producing primary groups;
      for each primary group of said primary groups:
        calculating primary characteristics of the pulses gathered in the primary group;
      gathering the primary groups as a function of the primary characteristics of primary groups and producing secondary groups;
      gathering the secondary groups as a function of secondary characteristics of the pulses gathered in each secondary group and producing residue tertiary groups.

* * * * *